(12) United States Patent
Dommaschk et al.

(10) Patent No.: US 8,907,640 B2
(45) Date of Patent: Dec. 9, 2014

(54) METHOD FOR REGULATION OF POWER CONVERTERS AND ARRANGEMENT FOR CARRYING OUT THE METHOD

(75) Inventors: Mike Dommaschk, Möhrendorf (DE); Jörg Dorn, Buttenheim (DE); Ingo Euler, Erlangen (DE); Franz Karlecik-Maier, Höchstadt (DE); Jörg Lang, Stadtsteinach (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 13/394,869

(22) PCT Filed: Aug. 17, 2010

(86) PCT No.: PCT/EP2010/061955
§ 371 (c)(1),
(2), (4) Date: Apr. 4, 2012

(87) PCT Pub. No.: WO2011/029700
PCT Pub. Date: Mar. 17, 2011

(65) Prior Publication Data
US 2012/0187924 A1 Jul. 26, 2012

(30) Foreign Application Priority Data
Sep. 8, 2009 (DE) .......................... 10 2009 040 745

(51) Int. Cl.
*H02M 5/293* (2006.01)
*H02J 3/18* (2006.01)

(52) U.S. Cl.
CPC ............... *H02J 3/1842* (2013.01); *Y02E 40/22* (2013.01)
USPC ......................................................... 323/237

(58) Field of Classification Search
USPC .......... 323/237; 363/89, 125, 7, 108, 114, 51, 363/45, 87, 127, 96; 307/104, 105
See application file for complete search history.

(56) References Cited

U.S. PATENT DOCUMENTS 6,052,297 A 4/2000 Akamatsu et al.
6,348,778 B1 2/2002 Weinhold et al.
(Continued)

FOREIGN PATENT DOCUMENTS

DE 197 37 590 C1 10/1997
DE 10 2006 054 870 A1 6/2008

OTHER PUBLICATIONS

Ikeda, et al., "A UPFC-Based Voltage Compensator with Current and Voltage Balancing Function", Applied Power Electronics Conference and Exposition, 2005, pp. 1838-1844, Twentieth Annual IEEE Austin, TX, USA Mar. 6-10, 2005, Piscataway, NJ, USA ISBN: 978-0-7803-8975-5.

*Primary Examiner* — Jessica Han
*Assistant Examiner* — Trinh Dang
(74) *Attorney, Agent, or Firm* — Laurence A. Greenberg; Werner H. Stemer; Ralph E. Locher

(57) ABSTRACT

A method for the closed-loop control of current converters for adjusting the counter-voltage in a multi-phase electric energy transmission network having a multi-phase connection line. In order to be parameterize in various operating states, phase currents are registered on the connection line and transformed into system current components by way of transformation, voltages are registered on the phases of the connection line, and counter-system voltage components are formed therefrom by way of transformation, which are supplied to a voltage controller. Counter-system current components serving to reduce the counter-system are formed in the voltage controller, which are supplied to a target value input of a current controller. System current components are connected to an actual value input of the current controller, the output parameters thereof serving after retransformation as switching currents for switching units of the current converter.

13 Claims, 2 Drawing Sheets

(56) References Cited

U.S. PATENT DOCUMENTS

| | | |
|---|---|---|
| 2005/0073280 A1 | 4/2005 | Yoshinaga et al. |
| 2008/0130335 A1* | 6/2008 | Yuzurihara et al. ........... 363/125 |
| 2010/0052322 A1 | 3/2010 | Fortmann et al. |
| 2011/0134669 A1* | 6/2011 | Yuzurihara et al. ............. 363/89 |

* cited by examiner

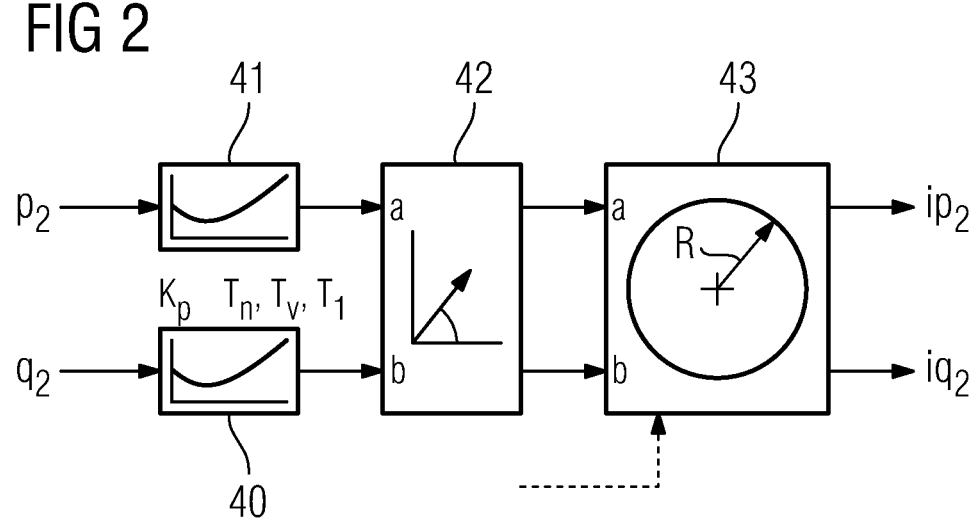

METHOD FOR REGULATION OF POWER CONVERTERS AND ARRANGEMENT FOR CARRYING OUT THE METHOD

BACKGROUND OF THE INVENTION

FIELD OF THE INVENTION:

The invention relates to a method for regulation of power converters for regulating out the back e.m.f. in a polyphase electrical power transmission system. This may be a static power-factor corrector—also referred to as a static Var compensator (SVC) or a VSC (Voltage Source Converter).

BRIEF SUMMARY OF THE INVENTION

The invention is based on the object of refining a method such as this such that it can be configured easily at every operating point.

This object is achieved by a method for regulation of power converters for regulating out the back e.m.f. in a polyphase electrical power transmission system, in which phase currents on a polyphase connecting line which is connected to the power transmission system are detected on the connecting line and transformed by means of transformation to positive phase-sequence system current components; in addition, voltages on the phases of the connecting line are detected, and negative phase-sequence system voltage components are formed by means of transformation therefrom, the negative phase-sequence system voltage components are supplied to a voltage regulator in which negative phase-sequence system current components which are used to reduce the negative phase-sequence system are formed, and the negative phase-sequence system current components are supplied to a nominal value input, and the positive phase-sequence system current components are supplied to an actual value input, of a current regulator, and its output variables are used, after back-transformation, as switching currents for switching units of the power converters.

One major advantage of the method according to the invention is that the method compensates for the negative phase-sequence system voltage by regulation of the negative phase-sequence system current. This ensures that the negative phase-sequence system current and the negative phase-sequence system voltage emits a pure negative phase-sequence system reactive power in order to support the voltage in the power supply system, with neither the negative phase-sequence system current nor the negative phase-sequence system voltage containing a zero component. The negative phase-sequence system current components which are generated by the voltage regulator are in this case regulated by means of the current regulator in an inner control loop. Cascade regulation is therefore formed with the voltage regulator and the current regulator, which regulation can easily be configured at every operating point, and does not require dynamic limits and compensation means. In this case, the regulation of the negative phase-sequence system voltage is decoupled from the current, voltage, reactive-power and real-power nominal values.

According to one development of the invention, reactive-power voltage regulation can be advantageously included in the method according to the invention, in that positive phase-sequence system voltage components are formed by means of transformation from the voltages on the phases of the connecting line, the positive phase-sequence system voltage components are supplied to a reactive-power voltage regulator, and its output current is supplied to an input of an adder, and the negative phase-sequence system current components at the output of the voltage regulator are supplied to a further input of the adder, and its output is connected to the nominal value input of the current regulator. This allows the negative phase-sequence system reactive power to be limited.

It is also considered to be advantageous for the method according to the invention to be supplemented in that the positive phase-sequence system voltage components are supplied to a real-power voltage regulator, and its output current is supplied to an additional input of the adder.

In contrast to the supplementary refinements of the method according to the invention described above, it may also be advantageous if positive phase-sequence system voltage components are formed by means of transformation from the voltages on the phases of the connecting line, the positive phase-sequence system voltage components are supplied to a real-power voltage regulator, and its output current is supplied to an additional input of an adder, and the negative phase-sequence system current components at the output of the voltage regulator are supplied to a further input of the adder, and its output is connected to the nominal value input of the current regulator. This allows only real-power regulation to be included in the method according to the invention, simplifying the overall method and dispensing with reactive-power voltage regulation.

In the method according to the invention, the negative phase-sequence system voltage components and the positive phase-sequence system voltage components may be formed in a different manner; however, it is considered to be advantageous for these components to be formed by means of Clark transformation with subsequent filtering and Park transformation. In the method according to the invention, regulators of different design may be used as voltage regulators; however, it is considered to be advantageous to use a voltage regulator in each case having a PI regulator for the negative phase-sequence system voltage components, for the output currents of the two PI regulators to be subjected to vector rotation in order to achieve a −90° phase angle with respect to the negative phase-sequence system voltage components, and to be freely variably limited.

The invention is furthermore based on the object of specifying an arrangement for carrying out the method according to the invention as described above, which arrangement can be configured comparatively easily.

In order to carry out this method, an arrangement according to the invention has a current detection device for the phase currents on the connecting line and a downstream transformation device for transformation of the phase currents to positive phase-sequence system current components, a voltage detection device for the voltages on the phases of the connecting line and a downstream further transformation device having a transformation module for transformation of the voltages to positive phase-sequence system voltage components, a voltage regulator which is arranged downstream from the transformation module and in which negative phase-sequence system current components which are used to reduce the negative phase-sequence system are formed, and a current regulator, which is arranged downstream from the voltage regulator, has a nominal value input which receives the negative phase-sequence system current components and have an actual value input which detects the positive phase-sequence system current components, with the output side of the current regulator being connected via a back-transformation device to switching inputs of switching units of the power converters.

This arrangement is distinguished by the advantages which have already been described in detail above, in conjunction with the method according to the invention.

In the arrangement according to the invention, the further transformation device advantageously has a further transformation module which forms positive phase-sequence system voltage components at its output by means of transformation from the voltages on the phases of the connecting line; a reactive-power voltage regulator is arranged downstream from the further transformation module and its output is connected to an input of a downstream adder, and the output of the voltage regulator is connected to a further input of the adder, and its output is connected to the nominal value input of the current regulator. An arrangement such as this additionally allows reactive-power voltage regulation to also be included.

If real-power regulation is also intended to be carried out, then a real-power voltage regulator is advantageously connected to the further transformation module, and its output is connected to an additional input of the adder.

The arrangement according to the invention operates reliably even when an embodiment without reactive-power voltage regulation is chosen, in which the further transformation device has a further transformation module, which forms positive phase-sequence system voltage components at its output by means of transformation from the voltages on the phases of the connecting line, a real-power voltage regulator is arranged downstream from the further transformation module and its output is connected to an additional input of an adder, and the output of the voltage regulator is connected to a further input of the adder, and its output is connected to the nominal value input of the current regulator.

The transformation modules of the further transformation device may be designed in a different manner; advantageously, one transformation module contains a filter for formation of the negative phase-sequence system voltage components, and a Park transformer arranged downstream therefrom, and the further transformation module contains a further filter for formation of the positive phase-sequence system voltage components, and a further Park transformer arranged downstream therefrom.

Advantageously, the further transformation device has a Clark transformer on the input side.

With regard to the voltage regulator in the arrangement according to the invention, an embodiment is considered to be advantageous in which the voltage regulator in each case has a PI regulator for the negative phase-sequence system voltage components, and an arrangement for vector rotation, in order to achieve a −90° phase angle with respect to the negative phase-sequence system voltage components, and a limiter arrangement are connected downstream from the two PI regulators. The advantage of this embodiment of the voltage regulator is that it is relatively simple and can thus be designed in a cost-effective manner.

In order to explain the invention further:

BRIEF DESCRIPTION OF THE SEVERAL VIEWS OF THE DRAWING

FIG. 2 shows one exemplary embodiment of the voltage regulator illustrated in the arrangement shown in FIG. 1.

DESCRIPTION OF THE INVENTION

Figure 1:
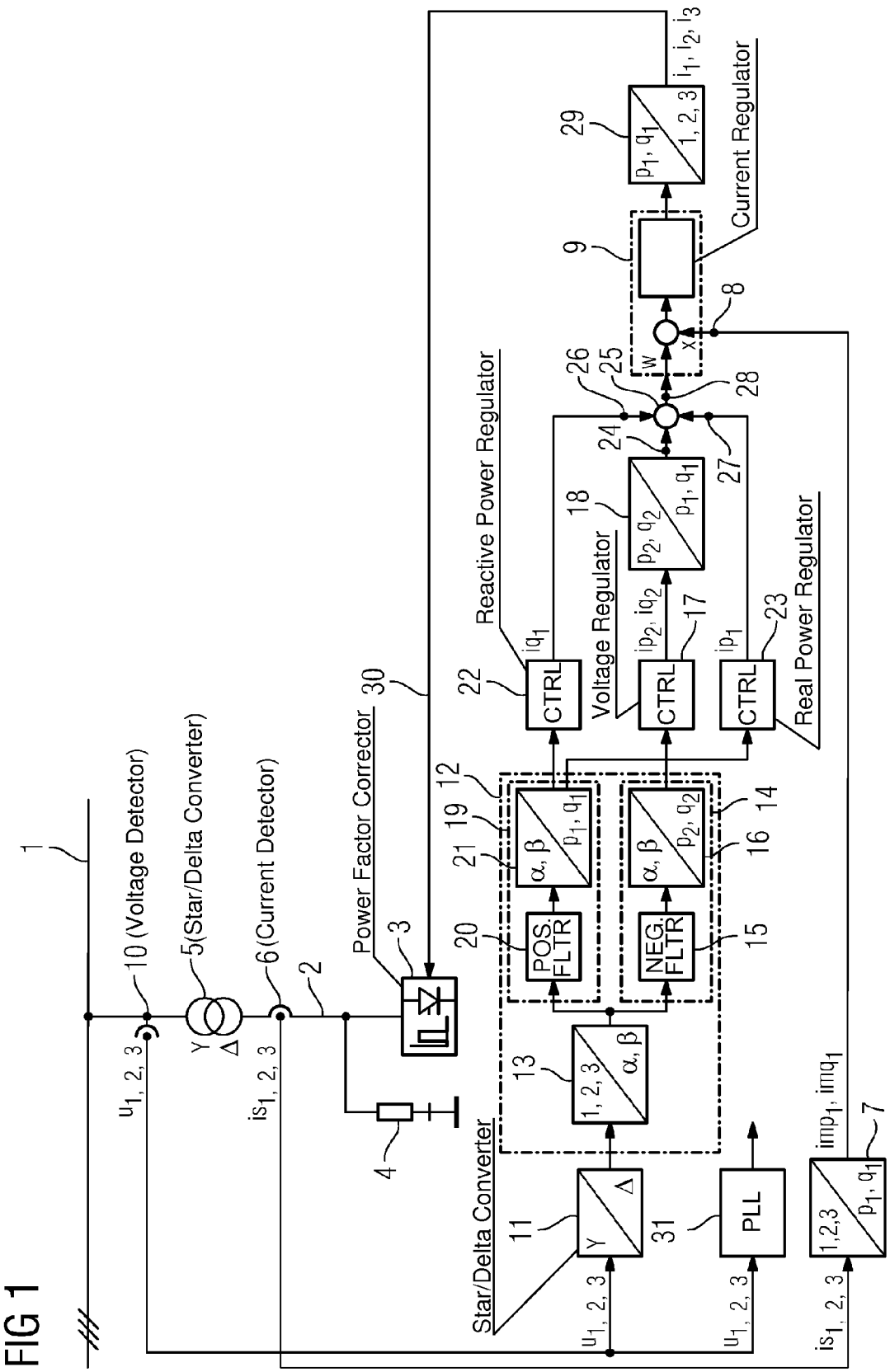
FIG. 1 shows one exemplary embodiment of an arrangement for carrying out the method according to the invention, in the form of a static power-factor corrector, in the form of a block diagram.

As FIG. 1 shows, a power-factor corrector 3 is connected via a polyphase connecting line 2 to a high-voltage AC voltage line 1, which has a plurality of phases, as an electrical power transmission system, and a filter 4 is connected in parallel with the power-factor corrector 3, in the normal manner. In the illustrated exemplary embodiment, a star-delta transformer 5 is located in the connecting line 2.

A current detection device 6 is also located in the connecting line 2, which current detection device 6 consists in the normal manner of current transformers and is therefore not illustrated in detail here, for the sake of better clarity. The current detection device 6 emits secondary currents is1, is2 and is3 for each phase of the connecting line 2 and supplies them to a transformation device 7, which transforms the detected currents is1, is2 and is3 to positive phase-sequence system current components imp1 and imq1 in a manner known per se. The positive phase-sequence system current components imp1 and imq1 are supplied as actual values to an actual value input 8 of a current regulator 9, which will be described in more detail later.

Voltages u1, u2 and u3 are detected on the high-voltage AC voltage line 1 by means of a voltage detection device 10, which is likewise not illustrated in detail here, for the sake of better clarity, and these voltages u1, u2 and u3 are supplied to a star-delta converter 11, which is designed in a known manner and therefore dose not need to be described in detail here.

A further transformation device 12 is arranged downstream from the star-delta converter 11 and, the input side, contains a Clark transformer 13, by means of which a Clark transformation, which is known per se, is carried out, thus resulting in voltage components α and β at the output of the Clark transformer. On the output side, a transformation module 14 is connected to the Clark transformer 13, which transformation module 14 contains a negative phase-sequence system filter 15 and a park transformer 16 arranged downstream therefrom. This Park transformer 16 is used to carry out a Park transformation, which is known per se, thus resulting in negative phase-sequence system voltage components p2 and q2 occurring at the output of the transformation module 14.

A voltage regulator 17 is connected to the transformation module 14 and is used to carry out negative phase-sequence system voltage regulation. In this case, regulation is carried out using a nominal value "zero", thus resulting in negative phase-sequence system current components ip2 and iq2 being produced at the output of the voltage regulator, and these are converted to negative phase-sequence system current components ip1 and iq1 in a downstream transformer 18.

Furthermore, the further transformation device 12 contains a further transformation module 19, which is likewise connected to the Clark transformer 13 and has a positive phase-sequence system filter 20 on the input side. A further Park transformer 21 is arranged downstream therefrom and carries out a Park transformation as a result of positive phase-sequence system voltage components p1 and q1 are produced at its output. The component q1 is supplied to a downstream reactive-power voltage regulator 22, which operates with a predetermined voltage nominal value, and produces a positive phase-sequence system current component iq1 at its output.

In addition, the further Clark transformer 21 is connected to a real-power regulator 23, and the real positive phase-sequence system voltage component p1 is applied to it. This regulator also has a set power nominal value, and produces a positive phase-sequence system current component ip1 at its output.

The outputs of the voltage regulator 17 and of the downstream transformer 18 are passed to an input 24 of an adder 25, which has a further input 26 connected to the output of the reactive-power regulator 22. An additional input 27 of the adder 25 is connected to the output of the real-power regulator 23.

The output of the adder 25 is connected to a nominal value input 28 of the current regulator 9, which produces corresponding positive phase-sequence system current components at its output. These are supplied to a module 29 for back-transformation, in which switching currents i1, i2 and i3 are formed for switching units, which are not illustrated, for the power converters of the power-factor corrector 3, and are supplied via a line 30 to the power-factor corrector 3.

In addition, it should also be noted that a PLL (Phase Locked Loop) circuit 31 is also connected to the voltage detection device 10 and is used, in a manner which is not illustrated in any more detail, for synchronization of the individual components in the illustrated arrangement.

FIG. 2 illustrates one exemplary embodiment for the voltage regulator 17 shown in FIG. 1. On the input side, the voltage regulator in each case contains a PI regulator 40 or 41, to whose inputs the negative phase-sequence system voltage components p2 and q2 are applied, that is to say the output variables of the Park transformer 16 shown in FIG. 1. The output variables of the two PI regulators 40 and 41 are supplied to an arrangement 42, in which a rotation process is carried out such that the phase angle of the vector is at 90° to the negative phase-sequence system voltage components. A limiter arrangement 43 is arranged downstream from the arrangement for vector rotation 42, in which limiter arrangement 43 a limit is set vectorially, corresponding to the characteristics of the power supply system with the high-voltage AC voltage line 1. This results in negative phase-sequence system currents ip2 and iq2, which are supplied via the transformer 18, together with the negative phase-sequence system current components ip1 and iq1 and the positive phase-sequence system current components imp1 and imq1, to the current regulator 9. For back-transformation, the output variable of the current regulator 9 is converted in the module 29 to the already mentioned switching currents i1, i2 and i3, in such a way that, overall, together with the voltage regulator 17—and if appropriate the reactive-power voltage regulator 22 and the real-power regulator 23, and together with the current regulator 9, cascade regulation is created, which can be configured particularly well.

The invention claimed is:

1. A method for a closed-loop control of power converters for regulating out a back e.m.f. in a polyphase electrical power transmission system, wherein a polyphase connecting line is connected to the polyphase electrical power transmission system, the method which comprises:
   detecting phase currents on the polyphase connecting line and transforming the phase currents by way of a transformation to positive phase-sequence system current components;
   detecting voltages on the phases of the connecting line and forming therefrom negative phase-sequence system voltage components by way of a transformation;
   supplying the negative phase-sequence system voltage components to a voltage regulator, and forming therein negative phase-sequence system current components that are used to reduce the negative phase-sequence system; and
   supplying the negative phase-sequence system current components to a nominal value input of a current regulator, and supplying the positive phase-sequence system current components to an actual value input of the current regulator, and, after back-transformation, using output variables of the current regulator as switching currents for switching units of the power converters.

2. The method according to claim 1, which comprises:
   forming the positive phase-sequence system voltage components by way of a transformation from the voltages on the phases of the connecting line;
   supplying the positive phase-sequence system voltage components to a reactive-power voltage regulator, and supplying an output current of the voltage regulator to an input of an adder; and
   supplying the negative phase-sequence system current components at an output of the voltage regulator to a further input of the adder, and connecting an output of the adder to a nominal value input of the current regulator.

3. The method according to claim 1, which comprises:
   forming positive phase-sequence system voltage components by way of a transformation from the voltages on the phases of the connecting line;
   supplying the positive phase-sequence system voltage components to a real-power voltage regulator, and supplying an output current of the real-power voltage regulator to an additional input of an adder; and
   supplying the negative phase-sequence system current components at the output of the voltage regulator to a further input of the adder, and connecting an output of the adder to a nominal value input of the current regulator.

4. The method according to claim 1, which comprises forming the negative phase-sequence system voltage components and the positive phase-sequence system voltage components by way of Clark transformation with subsequent filtering and Park transformation.

5. The method according to claim 1, which comprises:
   utilizing a voltage regulator in each case having a PI regulator as a voltage regulator for the negative phase-sequence system voltage components; and
   subjecting output currents of the two PI regulators to vector rotation in order to achieve a −90° phase angle with respect to the negative phase-sequence system voltage components, and limiting the output currents freely variably.

6. The method according to claim 2, which comprises supplying the positive phase-sequence system voltage components to a real-power voltage regulator, and supplying an output current of the real-power voltage regulator to an additional input of the adder.

7. An arrangement for carrying out the method according to claim 1, having:
   a current detection device for the phase currents on the connecting line and a downstream transformation device for transformation of the phase currents to positive phase-sequence system current components;
   a voltage detection device for the voltages on the phases of the connecting line and a downstream further transformation device having a transformation module for transformation of the voltages to negative phase-sequence system voltage components;
   a voltage regulator connected downstream from said transformation module and in which negative phase-sequence system current components which are used to reduce the negative phase-sequence system are formed; and
   a current regulator connected downstream from said voltage regulator, said current regulator having a nominal value input which receives the negative phase-sequence system current components and an actual value input which detects the positive phase-sequence system current components, with an output side of said current regulator being connected via a back-transformation device to switching inputs of switching units of the power converters.

8. The arrangement according to claim 7, wherein:
said further transformation device has a further transformation module configured to form positive phase-sequence system voltage components at an output thereof by way of transformation from the voltages on the phases of the connecting line;
a reactive-power voltage regulator is disposed downstream from the further transformation module and an output thereof is connected to an input of a downstream adder; and
an output of said voltage regulator is connected to a further input of said adder, and an output thereof is connected to a nominal value input of said current regulator.

9. The arrangement according to claim 7, wherein:
said further transformation device has a further transformation module, which forms positive phase-sequence system voltage components at an output thereof by way of transformation from the voltages on the phases of the connecting line;
a real-power voltage regulator is connected downstream from said further transformation module and an output thereof is connected to an additional input of an adder; and
an output of said voltage regulator is connected to a further input of said adder, and an output thereof is connected to the nominal value input of said current regulator.

10. The arrangement according to claim 7, wherein:
one transformation module contains a filter for formation of the negative phase-sequence system voltage components, and a Park transformer arranged downstream therefrom; and
said further transformation module contains a further filter for formation of the positive phase-sequence system voltage components, and a further Park transformer arranged downstream therefrom.

11. The arrangement according to claim 7, wherein said further transformation device has a Clark transformer on an input side thereof.

12. The arrangement according to claim 7, wherein:
said voltage regulator in each case has a PI regulator for the negative phase-sequence system voltage components; and
an arrangement for vector rotation, in order to achieve a −90° phase angle with respect to the negative phase-sequence system voltage components, and a limiter arrangement are connected downstream from said two PI regulators.

13. The arrangement according to claim 8, which comprises a real-power voltage regulator connected to said further transformation module and having an output connected to an additional input of said adder.

* * * * *